US011983560B2

United States Patent
Peng et al.

(10) Patent No.: US 11,983,560 B2
(45) Date of Patent: May 14, 2024

(54) METHOD FOR MATRIX DATA BROADCAST IN PARALLEL PROCESSING

(71) Applicant: Advanced Micro Devices, Inc., Santa Clara, CA (US)

(72) Inventors: Li Peng, Shanghai (CN); Jian Yang, Shanghai (CN); Chi Tang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/571,374

(22) Filed: Jan. 7, 2022

(65) Prior Publication Data

US 2022/0129312 A1    Apr. 28, 2022

Related U.S. Application Data

(63) Continuation of application No. 16/723,016, filed on Dec. 20, 2019, now Pat. No. 11,275,612.

(30) Foreign Application Priority Data

Dec. 19, 2019  (CN) .......................... 201911315653.8

(51) Int. Cl.
*G06F 9/48*  (2006.01)
*G06F 9/54*  (2006.01)
(Continued)

(52) U.S. Cl.
CPC ............ *G06F 9/4881* (2013.01); *G06F 9/542* (2013.01); *G06F 12/0815* (2013.01); *G06F 12/084* (2013.01); *G06F 15/7807* (2013.01)

(58) Field of Classification Search
None
See application file for complete search history.

(56) References Cited

U.S. PATENT DOCUMENTS

| 4,727,537 A | 2/1988 | Nichols |
| 5,379,297 A | 1/1995 | Glover et al. |

(Continued)

FOREIGN PATENT DOCUMENTS

| EP | 1052816 A2 | 11/2000 |
| WO | 9703549 A2 | 2/1997 |

OTHER PUBLICATIONS

International Search Report for PCT/US02/26813, dated Oct. 30, 2002, 6 pages.

*Primary Examiner* — Scott C Sun
(74) *Attorney, Agent, or Firm* — Kowert, Hood, Munyon, Rankin & Goetzel, P.C.; Rory D. Rankin

(57) ABSTRACT

Systems, apparatuses, and methods for efficient parallel execution of multiple work units in a processor by reducing a number of memory accesses are disclosed. A computing system includes a processor core with a parallel data architecture. One or more of a software application and firmware implement matrix operations and support the broadcast of shared data to multiple compute units of the processor core. The application creates thread groups by matching compute kernels of the application with data items, and grouping the resulting work units into thread groups. The application assigns the thread groups to compute units based on detecting shared data among the compute units. Rather than send multiple read access to a memory subsystem for the shared data, a single access request is generated. The single access request includes information to identify the multiple compute units for receiving the shared data when broadcasted.

19 Claims, 9 Drawing Sheets

(51) Int. Cl.
*G06F 12/0815* (2016.01)
*G06F 12/084* (2016.01)
*G06F 15/78* (2006.01)

(56) References Cited

U.S. PATENT DOCUMENTS

| | | |
|---|---|---|
| 5,440,547 A | 8/1995 | Easki et al. |
| 5,784,003 A | 7/1998 | Dahlgren |
| 5,857,078 A | 1/1999 | Date |
| 5,892,766 A | 4/1999 | Wicki et al. |
| 5,898,687 A | 4/1999 | Harriman et al. |
| 5,901,147 A | 5/1999 | Joffe |
| 5,905,998 A | 5/1999 | Ebrahim et al. |
| 5,915,104 A | 6/1999 | Miller |
| 5,918,074 A | 6/1999 | Wright et al. |
| 5,970,229 A | 10/1999 | Thomas et al. |
| 6,295,295 B1 | 9/2001 | Wicklund |
| 6,304,570 B1 | 10/2001 | Sakurai et al. |
| 6,396,809 B1 | 5/2002 | Holden et al. |
| 6,417,944 B1 | 7/2002 | Lahat et al. |
| 6,484,224 B1 | 11/2002 | Robins et al. |
| 6,542,502 B1 | 4/2003 | Herring et al. |
| 6,553,446 B1 | 4/2003 | Miller |
| 6,556,571 B1 | 4/2003 | Shahrier et al. |
| 6,611,519 B1 | 8/2003 | Howe |
| 6,629,147 B1 | 9/2003 | Grow |
| 6,654,346 B1 | 11/2003 | Mahalingaiah et al. |
| 6,661,774 B1 | 12/2003 | Lauffenburger et al. |
| 6,674,754 B1 | 1/2004 | Ofek |
| 6,687,247 B1 | 2/2004 | Wilford et al. |
| 6,735,679 B1 | 5/2004 | Herbst et al. |
| 6,745,277 B1 | 6/2004 | Lee et al. |
| 6,751,698 B1 | 6/2004 | Deneroff et al. |
| 6,754,211 B1 | 6/2004 | Brown |
| 6,754,222 B1 | 6/2004 | Joung et al. |
| 6,760,337 B1 | 7/2004 | Snyder, II et al. |
| 6,768,717 B1 | 7/2004 | Reynolds et al. |
| 6,781,994 B1 | 8/2004 | Nogami et al. |
| 6,907,001 B1 | 6/2005 | Nakayama et al. |
| 6,912,637 B1 | 6/2005 | Herbst |
| 6,940,814 B1 | 9/2005 | Hoffman |
| 6,950,394 B1 | 9/2005 | Chou et al. |
| 6,950,430 B2 | 9/2005 | Kalkunte et al. |
| 6,952,401 B1 | 10/2005 | Kadambi et al. |
| 6,959,002 B2 | 10/2005 | Wynne et al. |
| 6,975,638 B1 | 12/2005 | Chen et al. |
| 6,996,099 B1 | 2/2006 | Kadambi et al. |
| 6,999,415 B2 | 2/2006 | Luijten et al. |
| 7,002,926 B1 | 2/2006 | Eneboe et al. |
| 7,145,869 B1 | 12/2006 | Kadambi et al. |
| 7,274,692 B1 | 9/2007 | Hughes |
| 9,612,929 B1 | 4/2017 | Dusanapudi et al. |
| 9,817,594 B2 | 11/2017 | Holbrook et al. |
| 9,836,412 B2 | 12/2017 | McConnell |
| 10,459,859 B2 | 10/2019 | Jain et al. |
| 11,275,612 B2 | 3/2022 | Peng et al. |
| 2003/0035371 A1 | 2/2003 | Reed et al. |
| 2011/0314255 A1 | 12/2011 | Krishna et al. |
| 2019/0377493 A1 | 12/2019 | Hallnor et al. |
| 2020/0089550 A1 | 3/2020 | Christidis et al. |

Table 500

| Broadcast Identifier 512 | Total Broadcast Thread Group Number 514 | Iteration Size 516 | Base Address 518 | Broadcast Thread Group Start Counter 520 | Compute Unit Mask 522 | Size of Shared Data 524 |
|---|---|---|---|---|---|---|
| 0 | 4 | ¼ of Matrix B column or block (or 512B or 16 data items) | 0x04DE_8F10 | 3 | 0xF000 | 2KB (or 0x04DE_970F) |
| 1 | 4 | ¼ of Matrix B column or block (or 512B or 16 data items) | 0x04DE_9710 | 1 | 0x0F00 | 2KB (or 0x04DE_9F0F) |
| 2 | 4 | ¼ of Matrix B column or block (or 512B or 16 data items) | 0x04DE_9F10 | 0 | 0x00F0 | 2KB (or 0x04DE_A70F) |
| ... | | | | | | |

FIG. 5

METHOD FOR MATRIX DATA BROADCAST IN PARALLEL PROCESSING

CROSS REFERENCE TO RELATED APPLICATIONS

This application is a continuation of U.S. patent application Ser. No. 16/723,016, entitled "METHOD FOR MATRIX DATA BROADCAST IN PARALLEL PROCESSING", filed Dec. 20, 2019, which claims priority to Chinese Application No. 201911315653.8, entitled "METHOD FOR MATRIX DATA BROADCAST IN PARALLEL PROCESSING", filed Dec. 19, 2019, the entirety of which is incorporated herein by reference in its entirety.

BACKGROUND

Description of the Related Art

The parallelization of tasks is used to increase the throughput of computing systems. To this end, compilers extract parallelized tasks from program code to execute in parallel on the system hardware. Processor cores include deep pipelines configured to perform multi-threading. To further increase parallel execution on the hardware, a multi-core architecture includes multiple processor cores. The computing system offloads specific tasks to special-purpose hardware, which overcomes the performance limitations of conventional general-purpose cores. Some types of the special-purpose hardware include a single instruction multiple data (SIMD) parallel architecture, other types include a field-programmable gate array (FPGA), and yet other types include other specialized types of processing cores. When an architecture includes multiple cores of different types it is referred to as a heterogeneous multi-core architecture. Heterogeneous multi-core architectures provide higher instruction throughput than a homogeneous multi-core architecture for particular tasks such as graphics rendering, neural network training, cryptography and so forth.

Designers use one of multiple types of parallel computing platforms and application programming interface (API) models for developing software applications for heterogeneous computing. A function call in these platforms is referred to as a "compute kernel", or simply a "kernel". Software, such as an operating system scheduler, matches these software kernels with one or more records of data, such as data items, to produce one or more work units of computation. Generally speaking, a SIMD architecture offers good computing performance and cost efficiency when executing such data parallel workloads. However, performance reduces when memory bandwidth is limited and the application has high data reuse causing multiple memory accesses for the same data.

In view of the above, efficient methods for parallel execution of multiple work units in a processor by reducing a number of memory accesses are desired.

BRIEF DESCRIPTION OF THE DRAWINGS

The advantages of the methods and mechanisms described herein may be better understood by referring to the following description in conjunction with the accompanying drawings, in which:

FIG. 5 is a block diagram of one embodiment of a table used for supporting the broadcast of shared data for matrices.

Figure 1:
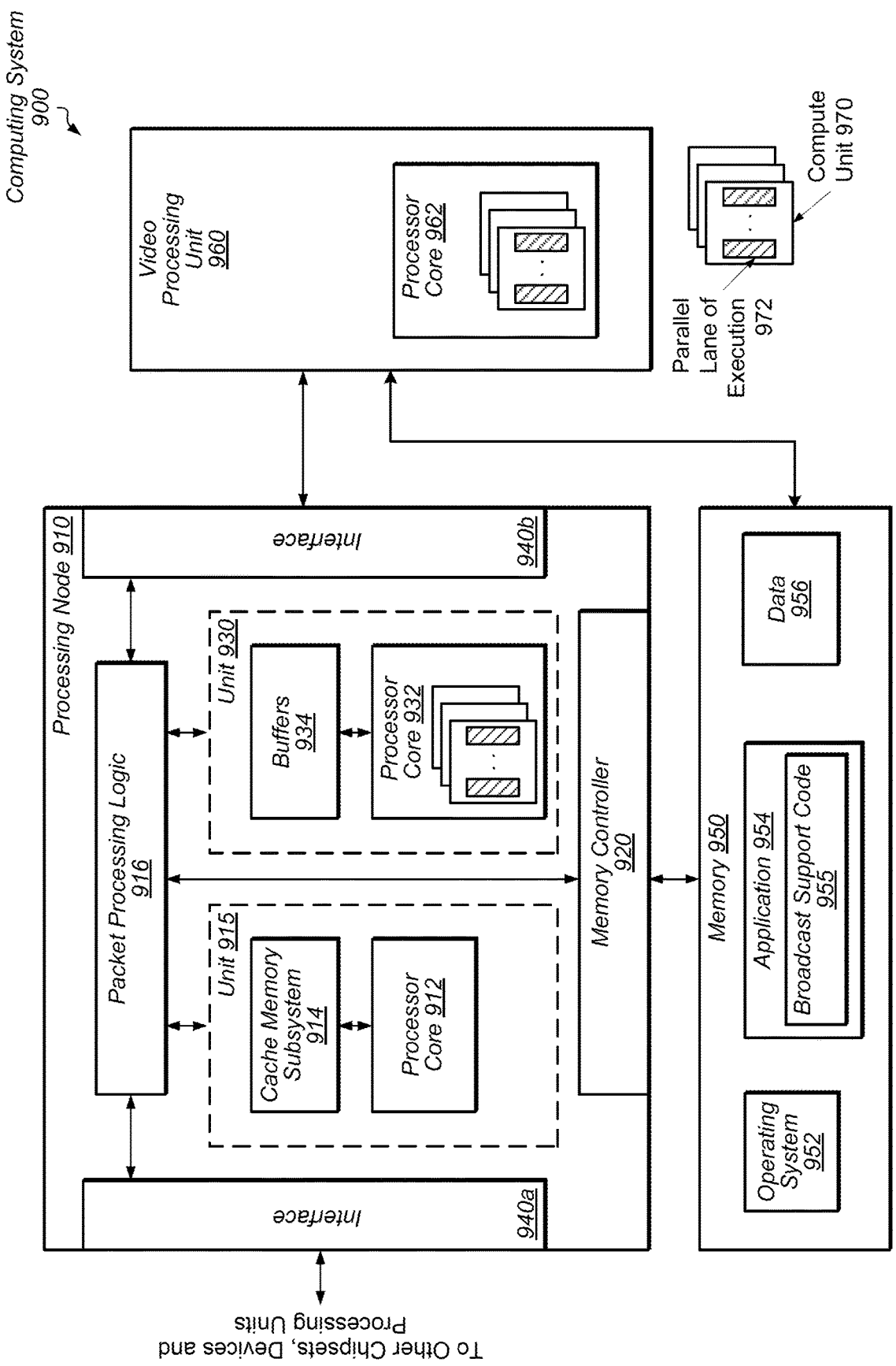
FIG. 1 is a block diagram of one embodiment of matrices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficient parallel execution of multiple work units in a processor by reducing a number of memory accesses are disclosed. In various embodiments, a computing system includes memory for storing an operating system, software applications developed by designers, and both user data and result data of the software applications. The computing system also includes a processing unit, which accesses the memory and executes instructions of the operating system and the applications. The processing unit includes one or more processor cores with a single instruction multiple data (SIMD) parallel architecture. In an embodiment, an accelerated processing unit on a motherboard includes the SIMD processor cores in addition to a general-purpose processor. In another embodiment, a video graphics card includes the SIMD processor cores. One or more of the software applications include instructions for directing a SIMD core to perform General Matrix to Matrix Multiplication (GEMM) operations such as multiplying two input matrices together to generate a third output matrix.

In one embodiment, the GEMM operations are used for neural network applications. For example, the application includes algorithms for the training of deep neural networks. Another software application is a graphics shader program directing how a SIMD processor core renders pixels for controlling lighting and shading effects. In addition, the application includes pixel interpolation algorithms for geometric transformations. Pixel interpolation obtains new pixel values at arbitrary coordinates from existing data. Yet other software applications include instructions for directing a SIMD core to perform GEMM operations for other scientific and business uses. The software application instructions operate on matrices with a number of rows and columns in a range of a few hundred to a few thousand, which results in a number of floating-point operations (FLOPs) in a range of a few million to a few billion.

In some embodiments, the designers use a parallel computing platform and corresponding application programming interface (API) models for developing the software applications using GEMM operations. An example of the parallel computing platform is the OpenCL® (Open Computing Language) framework. The OpenCL framework (generally referred to herein as "OpenCL") includes a C-like language. For video graphics applications, one example of the language is the GLSL (OpenGL Shading Language). A function call in the C-like language is referred to as an OpenCL kernel, a software kernel, a compute kernel, or simply a "kernel". The operating system includes instructions executable by a processor, such as a general-purpose processor, to assign multiple compute kernels of a software application performing GEMM operations to multiple compute units of a SIMD processor core. In some embodiments, the software application includes code segments that include instructions for supporting a shared data broadcast protocol in which shared data is broadcast to multiple compute units. In the shared data broadcast protocol, multiple compute units requiring shared data generate a request for the data, but only a single fetch of the data is generated. When the fetched data returns (e.g., from a cache, memory, etc.), it is broadcast to the compute units that requested the data. In this manner, memory bus bandwidth is not unnecessarily consumed by multiple fetch requests. In various embodiments, the compute kernels executing on the compute units of the SIMD processor core do not communicate with one another regarding the shared data and receive no indication from any other compute kernel specifying that the shared data is shared with any other compute unit.

In some embodiments, one or more of the compute kernels include instructions for storing broadcast characteristics for the shared data. In other embodiments, other code includes these instructions. The characteristics include a broadcast identifier, which is a unique identifier identifying the shared data, and a base address specifying a memory location storing a beginning of the shared data. In some embodiments, the characteristics also include a sum of the total number of compute units using the shared data. In some embodiments, program code other than the kernel itself includes instructions executable by circuitry of a processor for incrementing a count of compute units sending read access requests targeting the shared data when the instructions detect the read access requests. In some embodiments, the compute kernel includes instructions to indicate the current iteration of a thread requests shared data and the other program code (e.g., program code external to the kernel) increments counters accordingly. When the count of compute units targeting the shared data is equal to the stored sum, the instructions executable by a processor convey, to a memory subsystem, a single access request targeting the shared data.

In other embodiments, the instructions monitor a count of threads in a thread group requesting the shared data among the multiple compute units. The sum is a sum of threads from the multiple compute units. In one embodiment, when a processor executes the instructions, the processor generates the single access request when the count equals a sum of 32 threads from each of four compute units. Although, in an embodiment, the compute units include 64 parallel lanes for executing 64 threads, the processor generates the single read access request after each of the four compute units generates one or more read access requests for providing data to 32 lanes of the 64 lanes. Another number of lanes and other portions of the total number of lanes used for determining when to generate the single read access request are possible and contemplated. In yet other embodiments, the instructions monitor an amount of shared data requested by the multiple read access requests from the multiple compute units, rather than a number of compute units or a number of parallel lanes within the compute units.

In an embodiment, the compute kernel includes instructions for inserting in the single access request a mask identifying the compute units using the shared data. In another embodiment, the compute kernel includes instructions for generating the mask based on the broadcast identifier. In such embodiments, the single access request includes the broadcast identifier, but not the mask. In other embodiments, the single access request includes the mask, but not the broadcast identifier. When the compute kernel determines that the memory subsystem returns the shared data, the compute kernel broadcasts the shared data to the compute units identified by the mask. Therefore, the performance degradation effects based on the limits of the memory subsystem bandwidth are reduced due to the single access request and the broadcast of the retrieved shared data.

Referring to FIG. 1, one embodiment of matrices 100 used in operations is shown. As shown, Matrix A 110 and Matrix B 120 are inputs to a matrix operation 130, which generates Matrix C 150. The matrix operation 130 and the matrices 110, 120 and 150 are used in the training of neural networks, pixel interpolation during video graphics rendering, or one of a multiple other scientific and business applications. In various embodiments, the matrix operation 130 is a General Matrix to Matrix Multiplication (GEMM) operation. For example, in some embodiments, the matrix operation 130 is a multiply and accumulate (MAC) operation used to determine a dot product of two values of two input matrices. In other embodiments, the matrix operation 130 is another mathematical operation used to generate a third matrix, such as Matrix C 150, from two input matrices such as Matrix A 110 and Matrix B 120. Also shown are the assignments 140 of the input data values of the matrices 110 and 120 to compute units of a processor core with a single instruction multiple data (SIMD) parallel architecture. In an embodiment, the SIMD processor includes 16 compute units, each compute unit with 64 lanes of execution. In other embodiments, the SIMD processor core includes another number of compute units and another number of lanes per compute unit.

The Matrix A 110 is shown to include 16 blocks labeled A32 to A47. In one embodiment, each of the 16 blocks includes K data items where K is a positive, non-zero integer. In such an embodiment, the Matrix A 110 has a number of data items equal to 16 times K. Similarly, the Matrix B 120 is shown to include 1 block labeled B32. This single block has a number of data items equal to 1 times K, or K data items. The value K can be any number, and therefore, the matrices 110 and 120 are capable of being very large. For example, the number K of data items can have a range of a few dozen to a few hundred or even to a few thousand. When the range reaches a few thousand, the number of operations for the matrix operation 130 reaches a range of a few million to a few billion. In other embodiments, the value K represents an amount of data, which includes multiple data items. For example, if the value K represents 64 bytes and a data item has a size of 32 bits (4 bytes), then the value K represents (64/4) data items, or 16 data items.

The Matrix C 150 is shown to include 16×1 blocks labeled (A32, B32) to (A47, B32). Each block of the Matrix C 150 includes a combination performed by the matrix operation 130 of a block of Matrix A 110 with the block B32 of Matrix B 120. Therefore, the data items in the matrices 110 and 120 are combined by the matrix operation 130 in an order shown in the Matrix C 150 by the block labels. In some embodiments, a SIMD processor core performs the steps of the matrix operation 130 in a concurrent and parallel manner based on instructions of a software application. In various embodiments, a computing system includes memory for storing the software application written by software developers, and both user data and result data of the software applications. Here, the user data are the data items of the Matrix A 110 and Matrix B 120 while the result data are the data items of Matrix C 150.

In an embodiment, the SIMD processor core includes 16 compute units (CUs) as shown in the assignments 140, although in other embodiments, the SIMD processor core includes another number of compute units. Using the assignments 140, the compute unit 0 (CU0) of the SIMD processor core combines the data in block A32 of Matrix A 110 with the data in block B32 of Matrix B 120 using the steps of matrix operation 130. The software application written by software developers includes the steps of matrix operation 130. For example, the software application uses a function call with a definition defined in a particular library. The software developers use one of multiple types of parallel computing platforms and application programming interface (API) models for developing software applications. A function call in these platforms is referred to as a "compute kernel", or simply a "kernel".

In various embodiments, the memory also stores instructions of an operating system. In some embodiments, the instructions of the operating system are executed by a general-purpose processor core in the computing system. In one embodiment, the application or firmware matches these software kernels with one or more records of data, such as data items, to produce one or more work units of computation. The work units are partitioned into work groups, which are also referred to as "thread groups." Each thread group has an assigned unique identifier (ID). Rather than have the scheduler assign the thread groups to compute units, the software application or firmware manages the assignments. For example, when a compute unit has 64 parallel lanes of execution, the application or firmware partitions the work units into groups of 64, and the application or firmware assigns a thread group of 64 work units to a particular compute unit. The application or firmware performs the assignments shown in the compute unit assignments 140 (or assignments 140).

In a similar manner, based on the application or firmware, the compute unit 1 (CU1) of the SIMD processor core is assigned to combine the data in block A33 of Matrix A 110 with the data in block B32 of Matrix B 120 using the steps of matrix operation 130. Likewise, the compute unit 15 (CU15) of the SIMD processor core combines the data in block A47 of Matrix A 110 with the data in block B32 of Matrix B 120 using the steps of matrix operation 130, and so on for the compute units between CU1 and CU15. In some embodiments, the data of the matrices 110 and 120 are loaded into the compute units 0-15 of the SIMD processor core as many times as needed based on the assignments 140. For example, if K represents 256 data items with each data item having a 4 byte size, and each compute unit has 64 lanes of execution with each lane supporting operations on 4-byte data items, then the SIMD processor core uses (256/64) loads, or 4 loads to fill the 64 parallel execution lanes with data from block A32 and block B32.

Generally speaking, the SIMD architecture offers good computing performance and cost efficiency when executing parallel data workloads. However, performance reduces when memory bandwidth is limited and the application has high data reuse causing multiple memory accesses for the same data. As shown in the assignments 140, data reuse is typical in GEMM calculations. For example, each of the compute units CU0-CU15 loads and uses the same data in block B32 of Matrix B 120.

Without modification to the software application, in the illustrated embodiment, the software application generates 32 data fetches with 2 data fetches per compute unit. For example, compute unit 0 (CU0) uses 2 data fetches for data in block A32 and block B32. Similarly, compute unit 8 (CU8) uses 2 data fetches for data in block A40 and the same block B32. However, if the software application is modified to include broadcast support of reuse data, then the software application generates 17 data fetches, rather than 32 data fetches. For example, if the software application includes instructions for supporting fetching data in block B32 only once and broadcasting the fetched data to compute units 0-15, then the software application generates 16 data fetches for data in blocks A32-A47 and a single data fetch for data in block B32. The number of data fetches decreases from 32 data fetches to 17 data fetches.

In one example, one or more buses in the memory subsystem is smaller than the amount of data in the block B32 of Matrix B 120. Therefore, multiple data fetches occur for a "single" data fetch of the data in block B32, and the buses are used multiple times when transporting the data in the block B32. For example, when a bus to memory storing the data in block B32 has a width of 64 bytes, but the amount of data in block B32 is 512 bytes, the data fetch for block B32 uses eight separate data transports on the bus. When the data in block B32 is fetched multiple times, such as 16 times for each of the sixteen compute units in one embodiment, the resources of the memory subsystem are heavily loaded and latencies increase. Using the above example, without broadcast support, there are (16×8), or 128 data fetches for the 512 bytes of the block B32. As latencies increase, performance decreases. However, if the software application supports the broadcast of the data in block B32, and this data is fetched only once, rather than fetched for each of the sixteen compute units, then there are 8 data fetches for the 512 bytes of the block B32 compared to the 128 data fetches. Accordingly, the memory subsystem is not loaded as before, latencies decrease, and performance increases.

Figure 2:
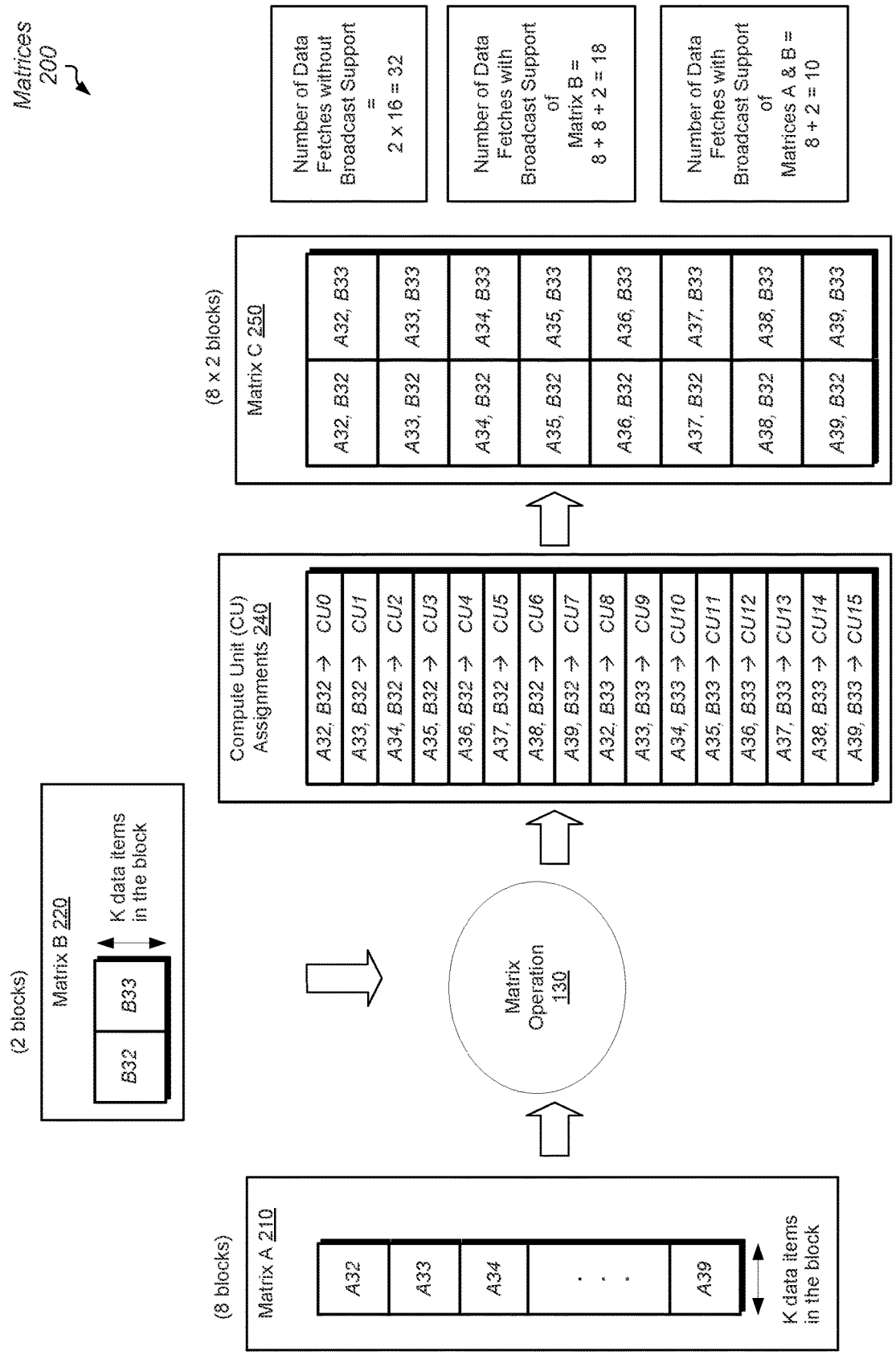
FIG. 2 is a block diagram of one embodiment of matrices.

Turning now to FIG. 2, one embodiment of matrices 200 used in operations is shown. Control logic described earlier is numbered identically. As shown, Matrix A 210 and Matrix B 220 are inputs to a matrix operation 130, which generates Matrix C 250. Similar to the matrices 100, the matrix operation 130 and the matrices 210, 220 and 250 are used in the training of neural networks, pixel interpolation during video graphics rendering, or one of a multiple other scientific and business applications. In various embodiments, the matrix operation 130 is a General Matrix to Matrix Multiplication (GEMM) operation. Also shown are the assignments 240 of the input data values of the matrices 210 and 220 to compute units of a SIMD processor core.

The Matrix A 210 is shown to include 8 blocks labeled A32 to A39. In one embodiment, each of the 8 blocks includes K data items. In such an embodiment, the Matrix A 210 has a number of data items equal to 8 times K. Similarly, the Matrix B 220 is shown to include 2 blocks labeled B32 and B33. Matrix B 220 has a number of data items equal to 2 times K. As described earlier, K is a positive, non-zero integer. The value K can be any number, and therefore, the matrices 210 and 220 are capable of being very large. In other embodiments, the value K represents an amount of data, which includes multiple data items. For example, if the value K represents 512 bytes and a data item has a size of 64 bits (8 bytes), then the value K represents (512/8) data items, or 64 data items.

The Matrix C 250 is shown to include 8×2 blocks labeled (A32, B32) and (A32, B33) to (A39, B32) and (A39, B33). Each block of the Matrix C 250 includes a combination performed by the matrix operation 130 of a block of Matrix A 210 with a block of Matrix B 220. Therefore, the data items in the matrices 210 and 220 are combined by the matrix operation 130 in an order shown in the Matrix C 250 by the block labels. In some embodiments, a SIMD processor core performs the steps of the matrix operation 130 in a concurrent and parallel manner based on instructions of a software application.

In an embodiment, the SIMD processor core includes 16 compute units (CUs) as shown in the compute unit assignments 240 (or assignments 240), although in other embodiments, the SIMD processor core includes another number of compute units. Using the assignments 240, the compute unit 0 (CU0) of the SIMD processor core combines the data in block A32 of Matrix A 210 with the data in block B32 of Matrix B 220 using the steps of matrix operation 130. In a similar manner, the compute unit 1 (CU1) of the SIMD processor core is assigned to combine the data in block A33 of Matrix A 210 with the data in block B32 of Matrix B 220 using the steps of matrix operation 130. Likewise, the compute unit 15 (CU15) of the SIMD processor core combines the data in block A39 of Matrix A 210 with the data in block B33 of Matrix B 220 using the steps of matrix operation 130, and so on for the compute units between CU1 and CU15.

In some embodiments, the data of the matrices 210 and 220 are loaded into the compute units 0-15 of the SIMD processor core as many times as needed based on the assignments 240. For example, if K represents 64 data items with each data item having a 8 byte size, and each compute unit has 32 lanes of execution with each lane supporting operations on 8-byte data items, then the SIMD processor core uses (64/32) loads, or 2 loads to fill the 32 parallel execution lanes with data from block A32 and block B32. As shown in the assignments 240, data reuse is typical in GEMM calculations. For example, each of the compute units CU0-CU7 loads and uses the same data in block B32 of Matrix B 220. Similarly, each of the compute units CU8-CU15 loads and uses the same data in block B33 of Matrix B 220.

Without modification to the software application using the matrix operation 130, in the illustrated embodiment, the circuitry of a processor executing the software application generates 32 data fetches with 2 data fetches for each of the 16 compute units. For example, compute unit 0 (CU0) uses 2 data fetches for data in block A32 and block B32. Similarly, compute unit 7 (CU7) uses 2 data fetches for data in block A39 and the same block B32. However, if the software application is modified to include broadcast support of reuse data (shared data) in the Matrix B 220, then the software application generates 18 data fetches, rather than 32 data fetches. For example, if the software application includes instructions for supporting fetching data in block B32 only once and broadcasting the fetched data to compute units 0-7, then for the left-most column of Matrix C 250, the software application generates 8 data fetches for data in blocks A32-A39 and a single data fetch for data in block B32. The number of data fetches for the left-most column of Matrix C 250 decreases from 16 data fetches to 9 data fetches.

If the software application additionally includes instructions for supporting fetching data in block B33 only once and broadcasting the fetched data to compute units 8-15, then for the right-most column of Matrix C 250, the software application generates 8 data fetches for data in blocks A32-A39 and a single data fetch for data in block B33. The number of data fetches for the right-most column of Matrix C 250 decreases from 16 data fetches to 9 data fetches. The total number of data fetches decreases from (16+16) data fetches, or 32 data fetches, to (9+9) data fetches, or 18 data fetches. If the software application additionally includes instructions for supporting fetching shared data in blocks A32-A39 of Matrix A 210 only once and broadcasting the fetched, shared data to compute units 0-15, then the software application generates 8 data fetches for data in blocks A32-A39, a single data fetch for data in block B32, and a data in block B33, which provides (8+1+1) data fetches, or 10 data fetches. As described earlier for matrices 100, when the software application supports the broadcast of the data, the data is fetched only once, the memory subsystem is not loaded as before without broadcast support, latencies decrease, and performance increases.

Figure 3:
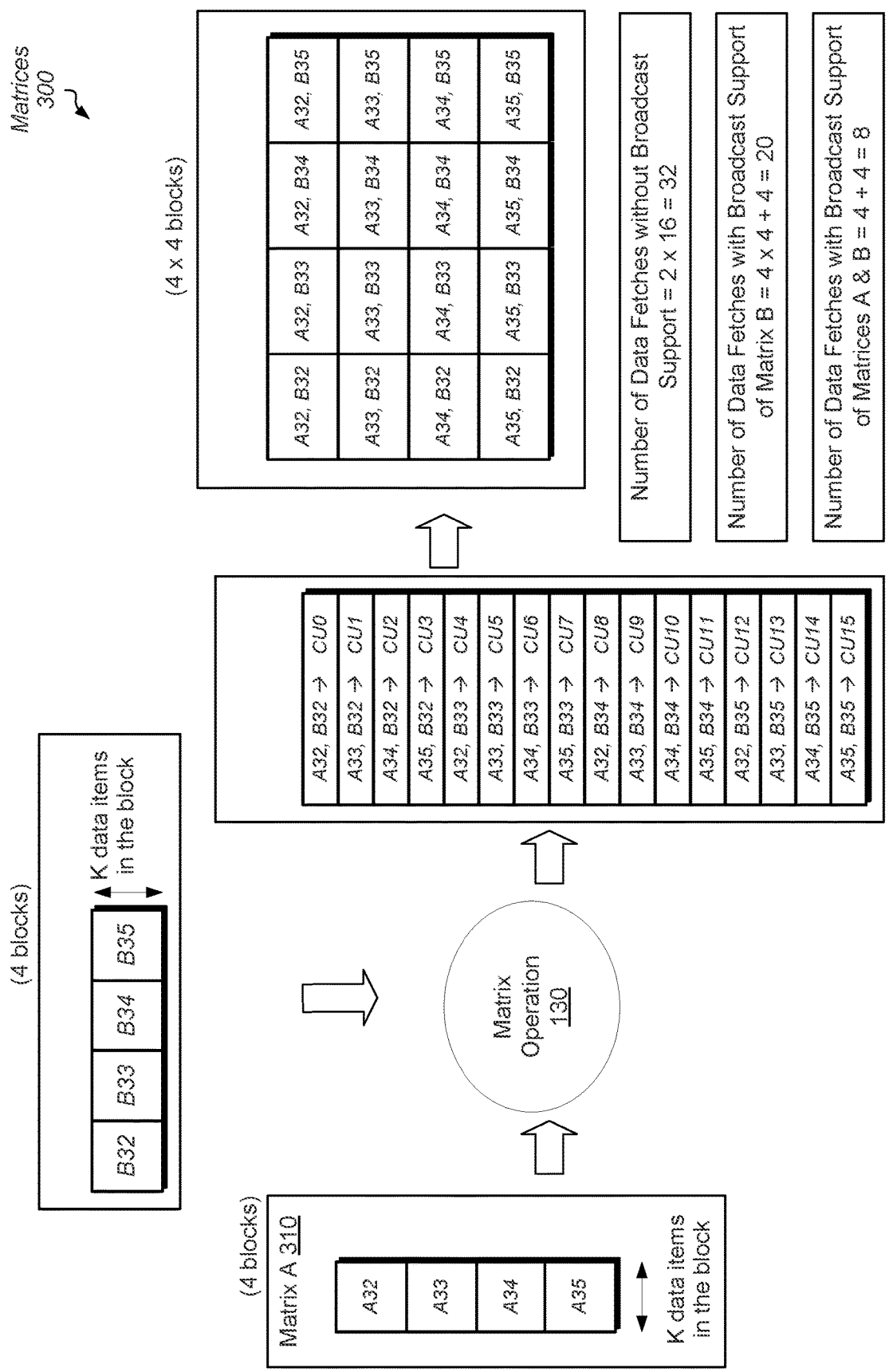
FIG. 3 is a block diagram of one embodiment of matrices.

Turning now to FIG. 3, one embodiment of matrices 300 used in operations is shown. Control logic described earlier is numbered identically. As shown, Matrix A 310 and Matrix B 320 are inputs to a matrix operation 130, which generates Matrix C 350. Similar to the matrices 100 and 200, the matrix operation 130 and the matrices 310, 320 and 350 are used in the training of neural networks, pixel interpolation during video graphics rendering, or one of a multiple other scientific and business applications. In various embodiments, the matrix operation 130 is a GEMM operation. Also shown are the assignments 340 of the input data values of the matrices 310 and 320 to compute units of a SIMD processor core.

The Matrix A 310 is shown to include 4 blocks labeled A32 to A35. In one embodiment, each of the 4 blocks includes K data items. In such an embodiment, the Matrix A 310 has a number of data items equal to 4 times K. Similarly, the Matrix B 320 is shown to include 4 blocks labeled B32 to B35. Matrix B 320 has a number of data items equal to 4 times K. As described earlier, K is a positive, non-zero integer. The value K can be any number, and therefore, the matrices 310 and 320 are capable of being very large. In other embodiments, the value K represents an amount of data, which includes multiple data items.

The Matrix C 350 is shown to include 4×4 blocks. The top row of Matrix C 350 includes blocks labeled (A32, B32), (A32, B33), (A32, B34) and (A32, B35). Each block of the Matrix C 250 includes a combination performed by the matrix operation 130 of a block of Matrix A 310 with a block of Matrix B 320. Therefore, the data items in the matrices 310 and 320 are combined by the matrix operation 130 in an order shown in the Matrix C 350 by the block labels. In some embodiments, a SIMD processor core performs the steps of the matrix operation 130 in a concurrent and parallel manner based on instructions of a software application.

In an embodiment, the SIMD processor core includes 16 compute units (CUs) as shown in the compute unit assignments 340 (or assignments 340), although in other embodiments, the SIMD processor core includes another number of compute units. As shown in the assignments 340, data reuse is typical in GEMM calculations. For example, each of the compute units CU0-CU3 loads and uses the same data in block B32 of Matrix B 320. Similarly, each of the compute units CU4-CU7 loads and uses the same data in block B33 of Matrix B 320, and so on.

Without modification to the software application using the matrix operation 130, in the illustrated embodiment, the software application generates 32 data fetches with 2 data fetches per compute unit. For example, compute unit 0 (CU0) uses 2 data fetches for data in block A32 and block B32. Similarly, compute unit 3 (CU3) uses 2 data fetches for data in block A35 and the same block B32. However, if the software application is modified to include broadcast support of reuse data (shared data) in Matrix B 320, then, in one embodiment, the software application generates 20 data fetches, rather than 32 data fetches. For example, if the software application includes instructions for supporting fetching shared data in block B32 only once and broadcasting the fetched, shared data to compute units 0-3, then for the left-most column of Matrix C 350, the software application generates 4 data fetches for data in blocks A32-A35 and a single data fetch for data in block B32. The number of data fetches for the left-most column of Matrix C 250 decreases from 8 data fetches to 5 data fetches.

If the software application additionally includes instructions for supporting fetching shared data in block B33 only once and broadcasting the fetched data to compute units 4-7, then for the second left-most column of Matrix C 350, the software application generates 5 total data fetches for data in blocks A32-A35 and data in block B33. If the software application includes instructions for fetching and broadcasting shared data in blocks B34 and B35 in a similar manner for fetching and broadcasting shared data in blocks B32 and B33, then the total number of fetches is (4×5), or 20 data fetches versus 32 data fetches. If the software application additionally includes instructions for supporting fetching shared data in blocks A32-A35 of Matrix A 310 only once and broadcasting the fetched data to compute units 0-15, then the software application generates 4 data fetches for data in blocks A32-A35, a single data fetch for data in block B32, and a single data fetch for data in block B33, which provides (4+1+1) data fetches, or 6 data fetches for the two left-most columns of Matrix C 350.

For the two right-most columns of Matrix C 350, two additional data fetches are performed to fetch data in blocks B34 and B35. Therefore, when the software application includes instructions supporting the broadcast of data in Matrix A 310 and Matrix B 320, the total number of data fetches increases from 6 data fetches to 8 data fetches for generating the Matrix C 350 from matrices 310 and 320. If the software application includes instructions supporting the broadcast of data only in Matrix B 320, then the number of data fetches decreases from 32 data fetches to 20 data fetches when generating the Matrix C 350 from matrices 310 and 320. In either case, as described earlier for matrices 100 and 200, when the software application supports the broadcast of the data, the memory subsystem is not loaded as before without broadcast support, latencies decrease, and performance increases.

Figure 4:
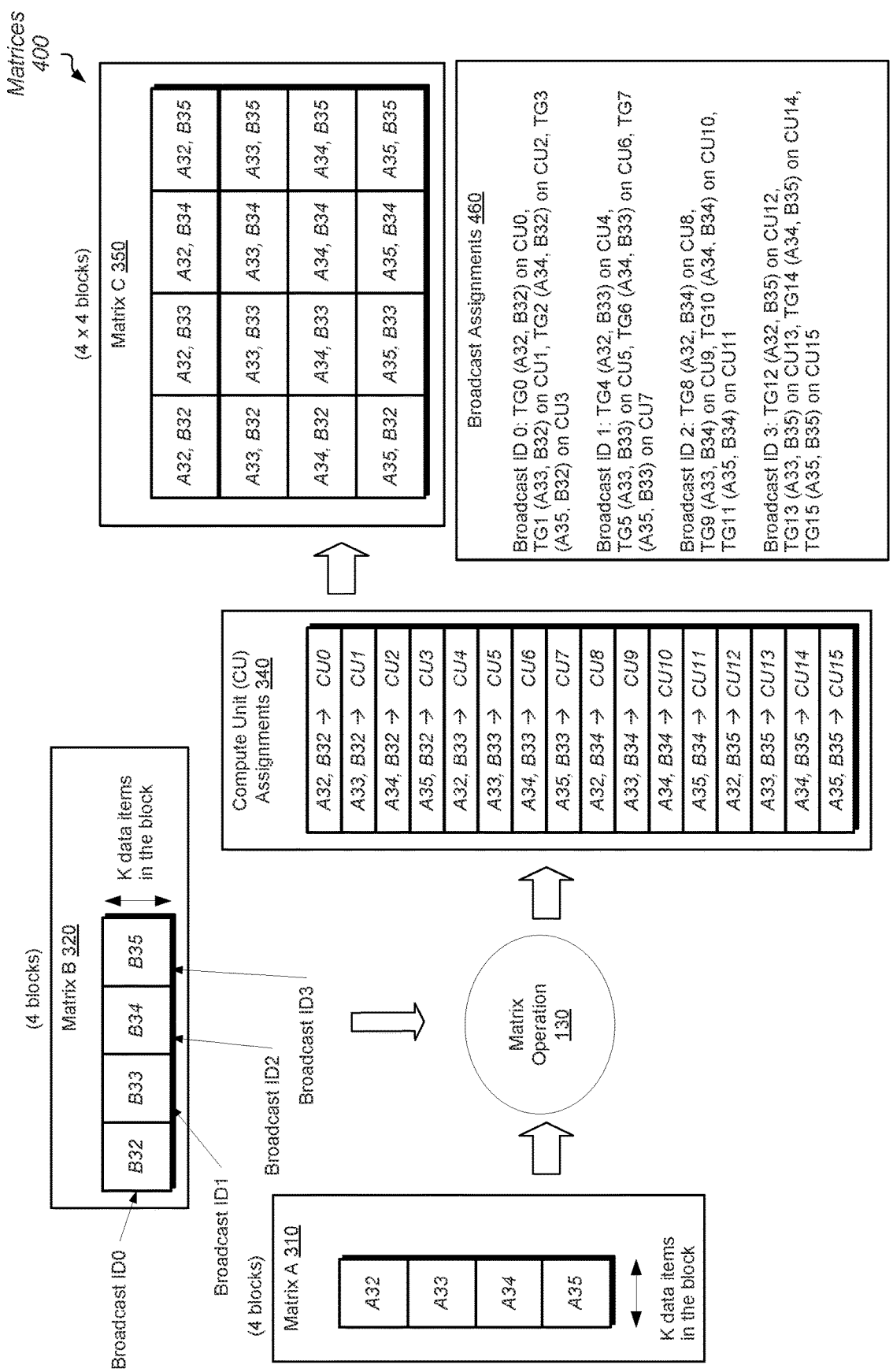
FIG. 4 is a block diagram of one embodiment of matrices.

Turning now to FIG. 4, one embodiment of matrices 400 used in operations is shown. Control logic and data values described earlier are numbered identically. The result Matrix C 350 and the input matrices 310 and 320 are shown again. In order to reduce the number of memory accesses, data in the columns of Matrix B 320 are associated with a broadcast identifier (ID). In one embodiment, instructions of a software application assign the broadcast identifier (ID) 0 to the data in the left-most column of Matrix B 320, which is the block B32. The thread groups (TGs) assigned to the data in block B32 are also assigned to the broadcast identifier 0. Therefore, thread groups 0-3 (TGs 0-3) are assigned to broadcast identifier 0 as shown in the broadcast assignments 460.

The thread groups 0-3 generate the left-most column of Matrix C 350 using the data in block B32 of Matrix B 320. The assignment to the broadcast identifier 0 indicates that the data fetch for the data in block B32 should occur once, rather than four times. For example, the data for a particular data item in the block B32 should be fetched once, rather than each of the four times logic in the four compute units 0-3 (CUs 0-3) generate a read access request for this particular data item. Each of the four CUs 0-3 still generate a read access request for the same data in block B32 while executing instructions of a GEMM software application, but a read access request is not sent to the memory subsystem until each of the four read access requests have been generated. In another example, each of the compute units CU8-CU11 generates a read access request for the same data in block B34. However, a read access request is not sent to the memory subsystem until each of the four read access requests have been generated.

Once each of the four read access requests have been generated, a single, separate read access request is generated and sent to the memory subsystem. This single read access request includes an indication specifying that the read access request is associated with a broadcast of the requested data. In one embodiment, the indication is a bit storing an asserted value to indicate the broadcast of the requested data. The single read access request also includes an indication of which compute units receive the requested data during the broadcast. In some embodiments, the single read access request includes a bit mask specifying which compute units receive the requested data during the broadcast. In other embodiments, the single read access request includes the broadcast identifier, which is later translated or decoded to determine which compute units receive the requested data during the broadcast. Therefore, when the data for block B32 is retrieved a single time from the memory subsystem, this data is concurrently provided to the compute units CU0-CU3. Similarly, when the data for block B34 is retrieved a single time from the memory subsystem, this data is concurrently provided to the compute units CU8-CU11.

Although broadcast identifiers are shown only for Matrix B 320, it is noted that in other embodiments, there are broadcast identifiers for blocks A32-A35 of Matrix A 310. In one embodiment, the thread groups (TGs) 0, 4, 8 and 12 assigned to the data in block A32 and to the compute units CU0, CU4, CU8 and CU12 are also assigned to the broadcast identifier 4 (not shown). In a similar manner, the thread groups (TGs) 1, 5, 9 and 13 assigned to the data in block A33 and to the compute units CU1 CU5, CU9 and CU13 are also assigned to the broadcast identifier 5 (not shown). In such embodiments, the software application includes instructions for fetching data for each of the thread groups before executing any one thread group. For example, when broadcast identifiers are used for both matrices 310 and 320, the compute unit CU0 generates read access requests for both the block A32 and the block B32. However, a single access request for the block B32 using broadcast identifier 0 is not generated until read access requests from compute units C1-C3 are generated. Similarly, a single access request for the block A32 using the broadcast identifier 4 (now shown) is not generated until read access requests from compute units C4, C8 and C12 are generated.

Turning now to FIG. 5, one embodiment of a table 500 for supporting data broadcast for matrix operations is shown. In some embodiments, the instructions of a software application, such as a GEMM software application, includes instructions for setting up the table 500. In an embodiment, a particular compute kernel includes the instructions. In another embodiment, the application includes the table setup instructions prior to the function calls used to define the compute kernels with the GEMM operations. Table 500 includes fields 512-524 for storing information used during the broadcast of shared data during matrix operations such as GEMM operations. The table 500 is stored in a set of registers, a random access memory, a content addressable memory, or other. In some embodiments, table 500 is setup as shown with each entry allocated for particular shared data to be broadcast. In other embodiments, each entry is a separate table. The table 500 provides the mappings (assignments) of thread groups to compute units.

Field 512 stores the broadcast identifier for shared data. As shown earlier in FIG. 4, each of the blocks B32-B35 of the Matrix B 320 has a unique broadcast identifier, which distinguishes the shared data of a particular block (e.g., B32) from the shared data of another block (e.g., B35). Field 514 stores an indication of a number of thread groups accessing the shared data identified by the corresponding broadcast identifier. In the earlier example shown for Matrix B 320, four of the sixteen compute units share data of each of the blocks B32-B35. For example, compute units CU0-CU3 share the data of block B32, compute units CU4-CU7 share the data of block B33, and so on. Field 516 stores an indication of the iteration size, which is used to determine an amount of shared data to fetch. For each single data fetch of shared data, a particular amount of the shared data is fetched, or retrieved. The indication of the amount of shared data is specified as a fraction of the total amount of the shared data, as a number of data items, as an absolute amount of data, or other. In some embodiments, the amount of shared data to fetch is specified in the original read access request targeting the shared data.

Field 518 stores a base address for the shared data of a particular block such as block B32 of Matrix B 320. The base address specifies a memory location storing a beginning of the shared data. As shown, the shared data corresponding to the broadcast identifier 0 has a base address of 0x04DE_8F10. Here, the notation "0x" indicates a hexadecimal value. The base address is also a reference address. In order to obtain absolute addresses of other data within the shared data, a particular displacement (or offset) value is added to the base address. When a first read access request targets the first quarter of the shared data, the base address and the size value indicating a quarter of the shared data is used in the first read access request. When a second read access request targets the second quarter of the shared data, a size of the quarter of the shared data is added as a displacement to the base address to provide the target address. In addition, a size value indicating a quarter of the shared data is used in the second read access request.

In an embodiment, instructions of the software application, which are executed on a processor core, also compare target addresses of read access requests to the base addresses in the field 518. When a target address is within a range of the base addresses in field 518, the corresponding read access request is targeting shared data and this read access request should be converted into a single read access request supporting the broadcast of the shared data. Field 520 stores a count of a number of outstanding read access requests targeting the corresponding shared data. As described earlier, the field 514 stores an indication of a number of thread groups accessing the shared data identified by the corresponding broadcast identifier.

Each time instructions of the software application cause logic in the processor core to detect an outstanding read access request targets particular shared data, the corresponding count in field 520 is updated. In an embodiment, updating the value stored in field 520 includes incrementing the value. In such embodiments, the initial value stored in field 520 is zero. In other embodiments, the initial value is equal to the value stored in field 514, and updating the value stored in field 520 includes decrementing the value. When the value stored in field 520 is not equal to a threshold value, the instructions of the software application cause logic in the processor core to prevent sending a read access request targeting the shared data. When updating the value stored in field 520 includes incrementing the value, the threshold value is the value stored in field 514. When updating the value stored in field 520 includes decrementing the value, the threshold value is zero.

When the value stored in field 520 is equal to the threshold value, in some embodiments, the instructions of the software application cause logic in the processor core to generate a single read access request used for broadcasting shared data. In other embodiments, circuitry in the processor core determines the value stored in field 520 is equal to the threshold value, and generates the single read access request without executing particular instructions directing the circuitry to do so. As described earlier, in an embodiment, this single read access request includes a bit storing an asserted value to indicate the broadcast of the requested data. This single read access request also includes an indication of which compute units receive the requested data during the broadcast. In some embodiments, this single read access request includes the broadcast identifier stored in field 512, which is later translated or decoded to determine which compute units receive the requested data during the broadcast. In other embodiments, this single read access request includes a bit mask specifying which compute units receive the requested data during the broadcast.

Field 522 stores the bit mask specifying which compute units receive the requested data during the broadcast. As shown, the shared data corresponding to broadcast identifier 0 includes the bit mask 0xF000, which specifies the compute units CU0-CU3 use the shared data. The shared data corresponding to broadcast identifier 1 includes the bit mask 0x0F00, which specifies the compute units CU4-CU7 use the shared data, and so on. In embodiments where the broadcast identifier is later decoded to generate the bit mask, the field 522 is not used in table 500. In some embodiments, table 500 includes field 524, which stores a size of the shared data. In the example, the shared data has a size of 2 kilobytes (KB). In another embodiment, field 524 includes an ending address for the shared data, so the addresses in the fields 518 and 524 provides the address range for the shared data. In yet other embodiments, logic uses the iteration size in field 516 and the based address in the field 518 to determine the address range and/or size of the shared data.

Figure 6:
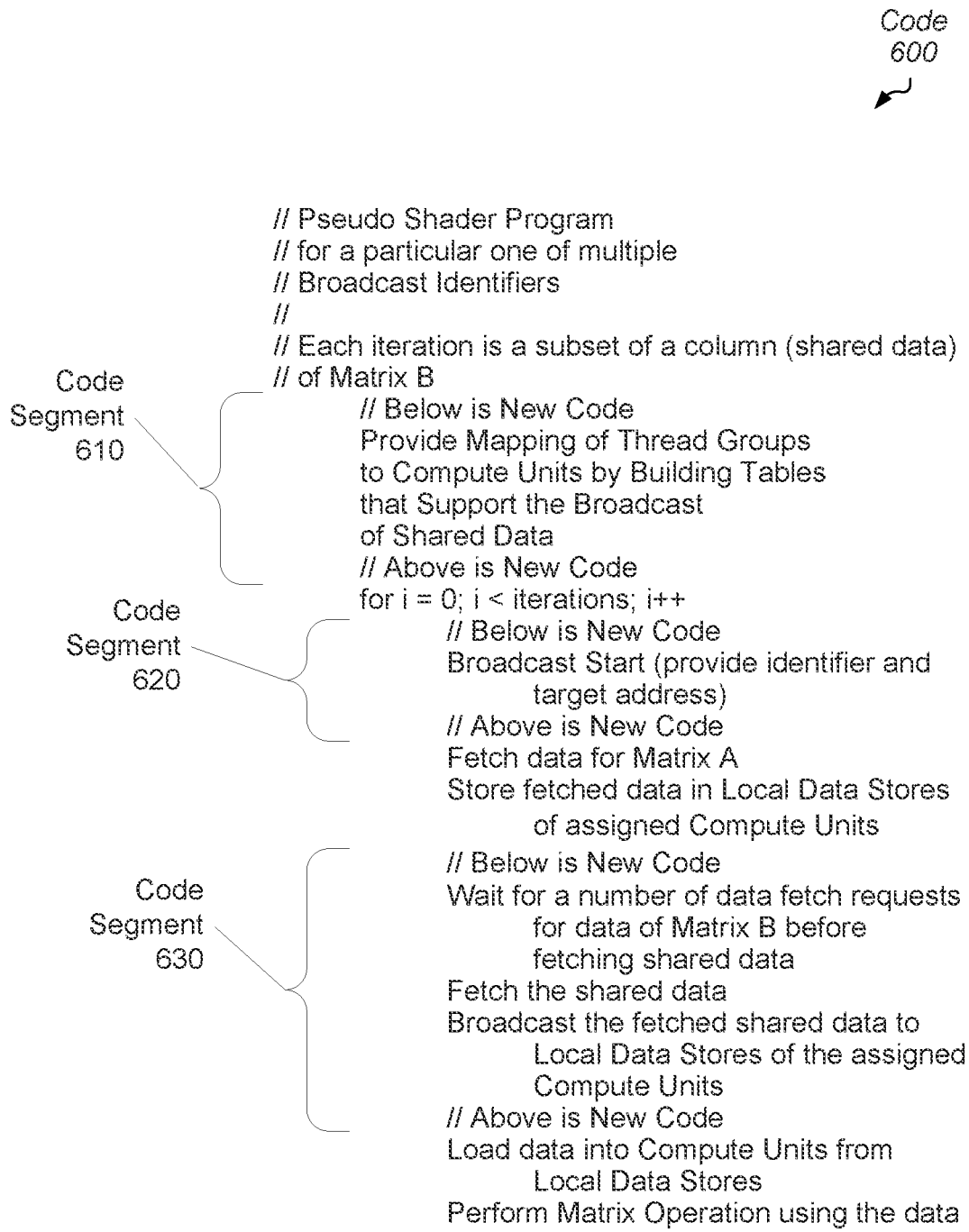
FIG. 6 is a block diagram of one embodiment of computer program code used for supporting the broadcast of shared data for matrices.

Turning now to FIG. 6, one embodiment of source code 600 utilizing broadcast support of shared data is shown. In various embodiments, a computing system includes system memory for storing an operating system, software applications developed by designers, and both user data and result data of the software applications. The computing system also includes a processing unit, which accesses the system memory, stores the information in a cache memory subsystem, and executes instructions of the operating system and the applications. The processing unit includes one or more processor cores with a single instruction multiple data (SIMD) parallel architecture. In an embodiment, an accelerated processing unit on a motherboard includes the SIMD processor cores in addition to a general-purpose processor. In another embodiment, a video graphics card includes the SIMD processor cores. Code 600 represents one example of a software application stored in the system memory. In some embodiments, portions of code 600 are also instructions of firmware stored in memory other than system memory or the cache memory subsystem such as an erasable read only memory or other random access memory. Code 600 includes instructions for directing a SIMD processor core or other circuitry to perform GEMM operations. Code 600 also includes code segments 610, 620 and 630 for supporting the broadcast of shared data.

In some embodiments, software developers use a parallel computing platform and corresponding application programming interface (API) models for developing the software applications using GEMM operations. An example of the parallel computing platform is the OpenCL® (Open Computing Language) framework. The OpenCL framework improves computing performance for a wide variety of data-parallel applications used in gaming, entertainment, science and medical fields. The OpenCL framework (generally referred to herein as "OpenCL") includes a C-like language. For video graphics applications, one example of the language is the GLSL (OpenGL Shading Language). A function call in the C-like language is referred to as an OpenCL kernel, a software kernel, a compute kernel, or simply a "kernel".

In an embodiment, code 600 is matched with data items to form work units and thread groups, which are assigned to compute units of the SIMD processor core. As shown earlier, in one embodiment, the assignments are performed by creating the table 500 (of FIG. 5). The code segments 610, 620 and 630 include instructions for supporting the broadcasting of shared data to multiple compute units. However, the compute kernels executing on the compute units of the SIMD processor core receive no indication from any other compute kernel specifying that the shared data is shared with any other compute unit. In various embodiments, code 600 is a computer program that includes a collection of compute kernels and internal functions. A software developer typically defines the compute kernels, whereas the internal functions are often defined in a library.

In some embodiments, code 600 operates on a particular column of a matrix such as the earlier Matrix B 320. A column of Matrix B 320 is a particular block such as block B32, B33 and so on. Each compute unit, such as CUs 0-15 in the earlier examples, executes the instructions of code 600, but operates on different data items. The earlier examples shown for matrices 100, 200, 300 and 400 illustrate that the compute units are grouped differently when sharing data. The sharing is based on the input matrices. Code segment 610 generates the mappings of thread groups to compute units. For example, code segment 610 builds one or more tables for supporting the broadcast of shared data by building a table similar to table 500 (of FIG. 5), which also assigns thread groups to particular compute units. In some embodiments, code segment 610 is placed in an outer loop, which includes code 600 within the loop. In an embodiment, each iteration of the "for loop" in code 600 operates on a partition or a subset of a column of a matrix such as Matrix B 350. For example, each iteration operates on one quarter of the data in block B32 of Matrix B 350. In some embodiments, field 516 of table 500 specifies the iteration size.

In various embodiments, when code segment 620 detects the generation of a read access request for shared data, code segment 620 generates a broadcast start message. In some embodiments, the code 600 include hints from a static compiler that indicate which read access requests target shared data and additionally which broadcast identifier corresponds to the shared data. For example, the static compiler compares the target addresses of the read access requests to address ranges of shared data. Therefore, code segment 620 detects the compiler hints. In other embodiments, no compiler hints are used, and code segment 620 performs the comparisons of target addresses of the read access requests to address ranges of shared data. The message includes an indication specifying the start of broadcast data, the corresponding broadcast identifier, and the target address.

In one embodiment, instructions of code 600 between code segments 620 and 630 fetch data for another matrix such as Matrix A 310 or another Matrix A of earlier examples. These instructions also store the fetched data in the local data store (LDS) of the corresponding compute unit. The instructions perform the fetching and storing on an individual basis for each data item. Code segment 630 detects the start of the broadcast message for Matrix B and updates a count such as the count of a number of read access requests targeting the same shared data. Code segment 630 also compares this count to a total number of thread groups sharing the shared data. This threshold is the same as the threshold stored in field 514 of table 500. When the count equals the threshold, code segment 630 generates a separate single read access request and sends it to the memory subsystem for fetching the requested data.

The generated single read access request includes an indication specifying that the read access request is associated with a broadcast of the requested data. In one embodiment, the indication is a bit storing an asserted value to indicate the broadcast of the requested data. The single read access request also includes an indication of which compute units receive the requested data during the later broadcast. In some embodiments, the single read access request includes a bit mask specifying which compute units receive the requested data during the broadcast such as the bit mask in field 522 of table 500. In other embodiments, the single read access request includes the broadcast identifier, which is later translated or decoded to determine which compute units receive the requested data during the broadcast. Therefore, when the memory subsystem provides the requested shared data based on a single memory access, this data is concurrently provided to the local data stores of the specified compute units. The code after code segment 630 reads data from the local data stores and performs the matrix operations, such as GEMM operations, using the data. The "for loop" of code 600 is repeated as necessary.

Figure 7:
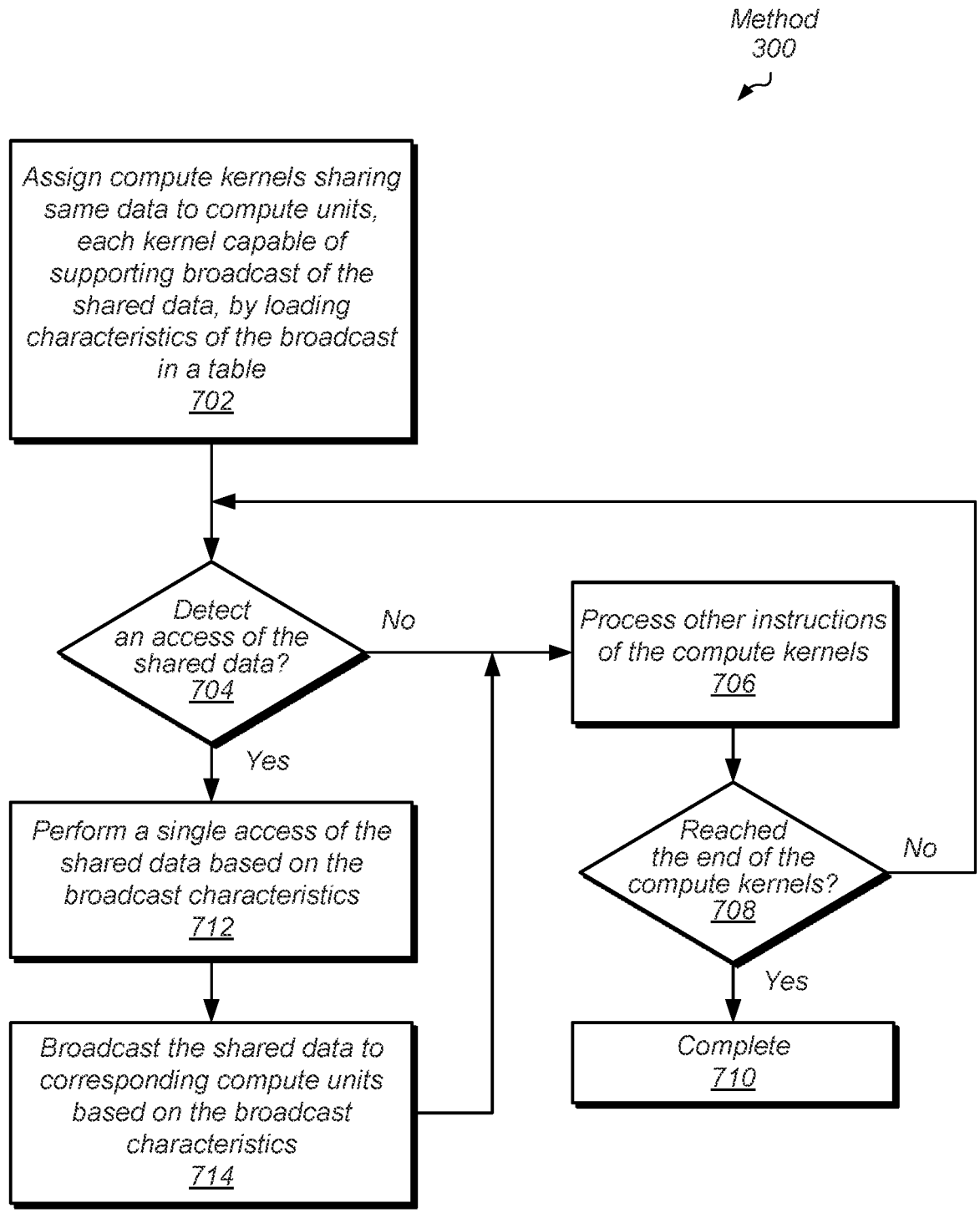
FIG. 7 is a flow diagram of one embodiment of a method for efficient parallel execution of multiple work units in a processor by reducing a number of memory accesses.

Referring now to FIG. 7, one embodiment of a method 700 for efficient parallel execution of multiple work units in a processor by reducing a number of memory accesses is shown. For purposes of discussion, the steps in this embodiment (as well as in FIG. 8) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 700 and 800.

Software developers design an application with GEMM operations. In one embodiment, logic and circuitry of a SIMD processor core executes the instructions of the application to perform the GEMM operations. In one embodiment, the application includes code similar to code 600 (of FIG. 6). The application generates multiple compute kernels. The application also assigns compute kernels sharing same data to compute units, each kernel capable of supporting broadcast of the shared data, by loading characteristics of the broadcast in a table (block 702). The application matches its compute kernels with one or more records of data, such as data items, to produce one or more work units of computation. The work units are partitioned into thread groups, each with its own assigned unique identifier (ID). The application assigns thread groups to compute units in a SIMD processor core. In one embodiment, the assignments are performed by creating the table 500 (of FIG. 5) with information in one or more of the fields 512-524.

In some embodiments, the application includes hints from a static compiler that indicate which read access requests target shared data and additionally which broadcast identifier corresponds to the shared data. For example, the static compiler compares the target addresses of the read access requests to address ranges of shared data. If a memory access is not detected to target shared data ("no" branch of the conditional block 704), then the application processes other instructions of the compute kernels (block 706). If the end of the compute kernels is reached ("yes" branch of the conditional block 708), then method 700 completes (block 710). However, if the end of the compute kernels is not reached ("no" branch of the conditional block 708), then control flow of method 700 returns to the conditional block 704 where it is determined whether a memory access of shared data has occurred.

If a memory access is detected to target shared data, such as the application detects a compiler hint ("yes" branch of the conditional block 704), then when executing the instructions of the application or firmware, the SIMD processor core and/or a cache controller perform a single access of the shared data based on the broadcast characteristics (block 712). In an embodiment, the application includes instructions for inserting in the single access request a mask identifying the compute units using the shared data. In another embodiment, the compute kernel includes instructions for generating the mask based on the broadcast identifier. In such embodiments, the single access request includes the broadcast identifier, but not the mask. In other embodiments, the single access request includes the mask, but not the broadcast identifier. When executing the instructions of the application or firmware, and the SIMD processor core and/or a cache controller determines that the memory subsystem returns the shared data, the shared data is broadcast to corresponding compute units based on the broadcast characteristics such as the mask (block 714).

Figure 8:
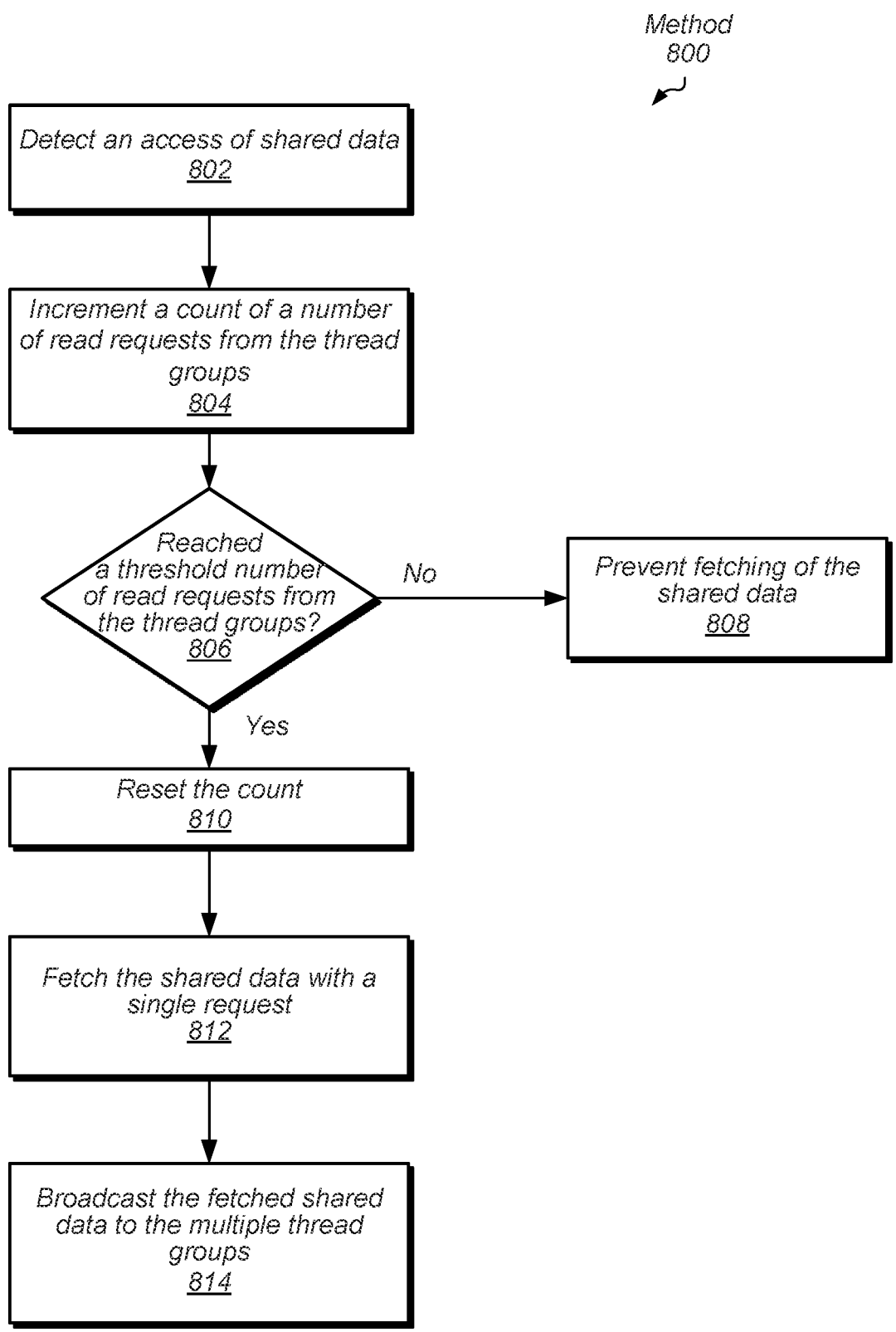
FIG. 8 is a flow diagram of one embodiment of a shared data broadcast protocol.

Referring now to FIG. 8, one embodiment of a shared data broadcast protocol 800 is shown. An application performing GEMM operations also assigns thread groups sharing same data to compute units by loading characteristics of the broadcast in a table. In one embodiment, the assignments are performed by creating the table 500 (of FIG. 5) with information in one or more of the fields 512-524. A compute kernel, executing for a thread group, conveys a read access request targeting shared data. The access of the targeted, shared data is detected (block 802). One or more of instructions of an application and circuitry of a processor increments a count of a number of read requests from the thread groups targeting the same shared data (block 804). In an embodiment, the application updates the field 520 of table 500.

If a threshold number of read requests from the thread groups has not been reached ("no" branch of the conditional block 806), then the application prevents fetching of the shared data (block 808). No read access request is issued to the memory subsystem. In one embodiment, one or more of instructions of the application and circuitry of a processor compares the updated value in field 520 of table 500 to the threshold value in field 514 of table 500. If the threshold number of read requests from the thread groups is reached ("yes" branch of the conditional block 806), then the count is reset (block 810). The shared data is fetched with a single read access request (block 812). For example, the single read access request described earlier with one or more of a broadcast identifier and a bit mask is conveyed to the memory subsystem. When the shared data is returned from the memory subsystem, the shared data broadcast to corresponding compute units based on the broadcast characteristics such as the mask (block 814).

Figure 9:
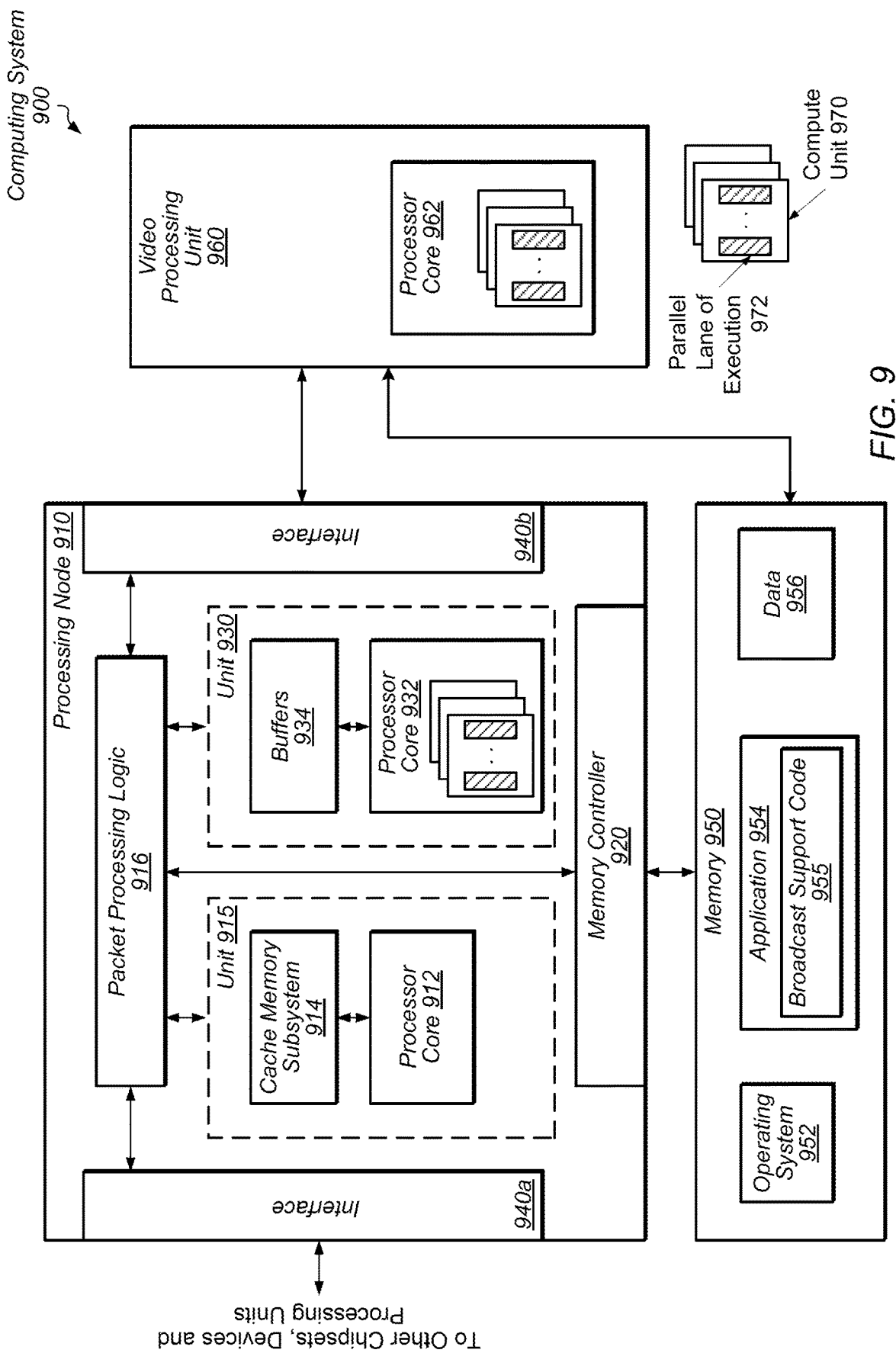
FIG. 9 is a block diagram of one embodiment of a computing system.

Referring to FIG. 9, one embodiment of a computing system 900 is shown. Processing node 910 includes one or more processing units such as unit 915 and unit 930. Unit 915 includes one or more processor cores 912 and an associated cache memory subsystem 914. Unit 930 includes one or more processor cores 932 and data storage buffers 934. The processing node 910 also includes memory controller 920, and interfaces 940a and 940b. The memory controller 920 includes logic and queues for servicing memory requests and memory responses, and communicating with memory 950 based on particular communication protocols. Interfaces 940a-940b also include logic and queues for servicing requests and responses, and for communicating with particular devices based on appropriate communication protocols. In one embodiment, interface 940b communicates with the video processing unit 960. In one embodiment, the illustrated functionality of at least processing node 910 is incorporated upon a single integrated circuit. In some embodiments, the functionality of the computing system 900 is incorporated on a system on chip (SoC). In yet other embodiments, the functionality of the video processing unit 960 is incorporated on a video graphics card inserted in a motherboard, which also includes the processing node 910 and interfaces to memory 950.

Other components such a phased locked loops (PLLs) and other clock generation circuitry, a power management unit, a shared cache memory subsystem, and so forth are not shown for ease of illustration. In one embodiment, processor core 912 utilizes a general-purpose micro-architecture. Processor core 932 is not a mirrored silicon image of processor core 912. Rather, processor core 932 has a micro-architecture different from the micro-architecture used by processor core 932. In one embodiment, the processor core 932 has a micro-architecture that provides high instruction throughput for a computationally intensive task such as a parallel data architecture. In an embodiment, the processor core 932 has a single instruction multiple data (SIMD) core. Examples of SIMD cores include graphics processing units (GPUs), digital signal processing (DSP) cores, or other. In a similar manner, processor core 962 of the video processing unit 960 also has a SIMD architecture. Each of the processor cores 932 and 962 include multiple compute units 970, each with multiple, parallel lanes 972 of execution. In one embodiment, processor core 962 has 16 compute units, each with 64 parallel lanes of execution. In other embodiments, another number of compute units and parallel lanes of execution are used.

Generally, processor core 912 accesses the cache memory subsystems 914, respectively, for data and instructions. If the requested block is not found in cache memory subsystem 914, then the processor core 912 generates a read access request and transmits it to the memory 950 via the memory controller 920. In a similar manner, processor core 932 generates memory access to transmit to memory 950 when requested data is not found in the buffers 934. In an embodiment, one or more of cache memory subsystem 914 and buffers 934 include high-speed cache memories configured to store blocks of data, and are implemented as a hierarchy of caches. Both the cache memory subsystem 914 and buffers 934 include a cache array memory and a corresponding cache controller.

Generally, packet processing logic 916 responds to control packets received on the links to which processing node 910 is coupled, to generate control packets in response to processor cores 912 and/or cache memory subsystems 914, to generate probe commands and response packets in response to transactions selected by memory controller 920 for service, and to route packets for which node 910 is an intermediate node to other nodes through interface logic 940a.

In some embodiments, the processor core 962 executes graphics-intensive applications, such as vertex shaders or pixel shaders, on large numbers of objects (vertices or pixels). Since each object is processed independently of other objects, but the same sequence of operations is used, the SIMD architecture using the compute units 970 and the lanes 972 provides considerable performance enhancement. In some embodiments, the processor core 932 executes applications directed at neural network training, which also processes objects independently of other objects, but the same sequence of operations is used. Therefore, these types of applications also benefit from the SIMD architecture using the compute units 970 and the lanes 972.

In various embodiments, the memory 950 includes one or more of a hard disk drive, a solid state disk, other types of flash memory, a portable solid state drive, a tape drive and so on. The memory 950 stores the operating system 952, the application 954 and data 956. Although a single operating system and a single application are shown, in other embodiments, another number of these software components are stored in memory 950. The operating system 952 includes instructions for initiating the boot up of the processing node 910, assigning tasks to hardware circuitry, managing resources of the computing system 900 and hosting one or more virtual environments.

In some embodiments, the general-purpose processor core 912 executes the instructions of the operating system 952. In some embodiments, the application 954 uses GEMM operations for neural network training, pixel interpolation during graphics rendering, or other. In one embodiment, the application 954 matches its software kernels with one or more records of data, such as data items in the data 956, to produce one or more work units of computation. The work units are partitioned into thread groups, each with its own assigned unique identifier (ID). The application 954 also includes code for supporting the broadcast of shared data such as broadcast support code 955. In one embodiment, the code 955 is similar to the code segments 610, 620 and 630 of code 600 (of FIG. 6).

One or more of the code 955 and firmware assign thread groups to compute units 970 in one or more of the SIMD processor core 932 and the SIMD processor core 962 depending on the application being processed. In one embodiment, the assignments are performed by creating the table 500 (of FIG. 5). For example, in one embodiment, the application 954 assigns thread groups for pixel interpolation to the SIMD processor core 962 of the video processing unit 960, and the application 954 assigns thread groups for neural network training to the SIMD processor core 932 of the unit 930. Other types of assignments for these and other applications are possible and contemplated. When the software application 954 includes code 955 for supporting the broadcast of the shared data, the shared data is fetched only once, the memory subsystem is not loaded as without broadcast support, latencies decrease, and system performance increases.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first interface comprising circuitry configured to communicate with a processor comprising a plurality of compute units, each configured to process instructions; and
   circuitry configured to:
   detect a plurality of threads targeting given data; and
   broadcast the given data to the plurality of threads, subsequent to generation of only a single request for the given data; and
   insert, in the single request, one or more of:
   a broadcast identifier identifying the given data; and
   a mask identifying compute units of the plurality of compute units that generated a request for the given data.

2. The apparatus as recited in claim 1, wherein the circuitry is configured to generate the single request responsive to a qualifying condition being satisfied.

3. The apparatus as recited in claim 2, wherein the circuitry is configured to
   determine the qualifying condition is satisfied, responsive to determining the plurality of threads includes at least a threshold number of threads.

4. The apparatus as recited in claim 1, wherein the plurality of threads include threads that are determined:
   to have issued a read request for the given data; and
   have not, but will, issue a read request in a current iteration.

5. The apparatus as recited in claim 1, wherein the circuitry is configured to store broadcast characteristics for the given data comprising one or more of:
- the broadcast identifier identifying the given data; and
- a base address specifying a memory location storing a beginning of the given data.

6. The apparatus as recited in claim 3, wherein the threshold number of threads is stored in a field.

7. The apparatus as recited in claim 1, further comprising a cache controller configured to:
- receive the mask in the single request; and
- include the broadcast identifier in the single request.

8. The apparatus as recited in claim 7, wherein the cache controller is configured to convey the mask during the broadcast of the given data to the compute units.

9. A method, comprising:
- detecting, by circuitry, a plurality of threads targeting given data; and
- broadcasting, by the circuitry, the given data to the plurality of threads,
  - subsequent to generation of only a single request for the given data inserting, in the single request, one or more of:
    - a broadcast identifier identifying the given data; and
    - a mask identifying threads of the plurality of threads that generated a request for the given data.

10. The method as recited in claim 9, further comprising generating the single request responsive to a qualifying condition being satisfied.

11. The method as recited in claim 10, wherein the qualifying condition is the plurality of threads including at least a threshold number of threads.

12. The method as recited in claim 11, further comprising maintaining a count of a number of threads targeting the given data; and
- incrementing the count responsive to detecting the plurality of threads include threads that are determined:
  - to have issued a read request for the given data; and
  - have not, but will, issue a read request in a current iteration.

13. The method as recited in claim 11, further comprising preventing sending an access request targeting the given data, responsive to determining the plurality of threads include fewer than the threshold number of threads.

14. The method as recited in claim 9, further comprising storing broadcast characteristics for the given data comprising one or more of:
- the broadcast identifier, wherein the broadcast identifier is a unique identifier identifying the given data; and
- a base address specifying a memory location storing a beginning of the given data.

15. A computing system comprising:
- a processing unit comprising a plurality of compute units;
- a memory coupled to the processing unit, and storing an application, and data; and
- wherein the application comprises instructions executable by circuitry of the processing unit to:
  - detect a plurality of threads targeting given data stored in the memory;
  - broadcast the given data to the plurality of threads, subsequent to generation of only a single request for the given data;
  - insert, in the single request, one or more of:
    - a broadcast identifier identifying the given data; and
    - a mask identifying compute units of the plurality of compute units that generated a request for the given data.

16. The computing system as recited in claim 15, wherein the instructions are executable by the processing unit to generate the single request responsive to a qualifying condition being satisfied.

17. The computing system as recited in claim 16, wherein the qualifying condition is the plurality of threads includes at least a threshold number of threads.

18. The computing system as recited in claim 15, wherein the application comprises instructions further executable by the processing unit to store broadcast characteristics for the given data comprising one or more of:
- the broadcast identifier, wherein the broadcast identifier is a unique identifier identifying the given-data; and
- a base address specifying a memory location storing a beginning of the given data.

19. The computing system as recited in claim 18, wherein the single request comprises the broadcast identifier.

* * * * *

UNITED STATES PATENT AND TRADEMARK OFFICE
CERTIFICATE OF CORRECTION

| | |
|---|---|
| PATENT NO. | : 11,983,560 B2 |
| APPLICATION NO. | : 17/571374 |
| DATED | : May 14, 2024 |
| INVENTOR(S) | : Peng et al. |

It is certified that error appears in the above-identified patent and that said Letters Patent is hereby corrected as shown below:

In the Claims

Column 19, Claim 9, Line 22, please delete "given data inserting, in the" and substitute -- given data; inserting, in the --.

Signed and Sealed this
Thirtieth Day of July, 2024

Katherine Kelly Vidal
*Director of the United States Patent and Trademark Office*